US005959642A

United States Patent [19]

Fujioka et al.

[11] Patent Number: 5,959,642

[45] Date of Patent: Sep. 28, 1999

[54] PRINTER HAVING A SHOCK ABSORBER FOR A PRINTER MOTOR

[75] Inventors: Satoshi Fujioka; Masanori Yoshida, both of Nagano, Japan

[73] Assignee: Seiko Epson Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/628,427

[22] Filed: Apr. 5, 1996

[30] Foreign Application Priority Data

Apr. 7, 1995 [JP] Japan .................................... 7-108327

[51] Int. Cl.[6] ............................ B41J 23/00; B41J 29/02; F16M 13/00; F16F 7/00

[52] U.S. Cl. ......................... 347/37; 248/635; 267/141.3; 400/694

[58] Field of Search .......................... 347/37, 32; 310/51, 310/91, 217; 248/635, 634; 267/141.3, 141.714, 141.2; 285/89, 235, 236, 392; 342/32; 400/694, 693; 262/141.3, 141.2, 293, 294

[56] References Cited

U.S. PATENT DOCUMENTS

| | | | |
|---|---|---|---|
| 4,306,708 | 12/1981 | Gassaway et al. | 267/141.3 |
| 5,131,619 | 7/1992 | Daugherty | 248/635 |

FOREIGN PATENT DOCUMENTS

| | | | |
|---|---|---|---|
| 59-062178 | 4/1984 | Japan | B41J 29/00 |
| 59-136280 | 8/1984 | Japan | B41J 19/20 |
| 62-085973 | 4/1987 | Japan | B41J 19/04 |
| 63-053086 | 3/1988 | Japan | B41J 29/08 |
| 2-30571 | 1/1990 | Japan . | |
| 2-25750 | 2/1990 | Japan . | |
| 2-65076 | 5/1990 | Japan . | |
| 2-208085 | 8/1990 | Japan | B41J 29/08 |
| 2-110962 | 9/1990 | Japan . | |
| 5-74851 | 10/1990 | Japan . | |
| 3-081175 | 4/1991 | Japan | B41J 29/08 |
| 4-72852 | 6/1992 | Japan . | |
| 5-126182 | 8/1993 | Japan | F16F 1/37 |
| 6-14583 | 2/1994 | Japan . | |
| 6-30511 | 4/1994 | Japan . | |
| 6-80936 | 11/1994 | Japan . | |
| 7-71498 | 3/1995 | Japan . | |
| 882285 | 11/1961 | United Kingdom . | |
| 884170 | 12/1961 | United Kingdom . | |

*Primary Examiner*—N. Le
*Assistant Examiner*—Thien Tran
*Attorney, Agent, or Firm*—Stroock & Stroock & Lavan LLP

[57] ABSTRACT

A printer having a novel and improved mechanism for damping noise caused by the vibration of a motor of the printer is provided. The printer includes a frame having a hole therein, and a carriage mounted on the frame capable of moving relative thereto. A motor is mounted on the frame and operatively coupled to the carriage to reciprocate relative to the frame. A shock absorber, made of a resilient material, is interposed between the motor and the frame. The shock absorber has a stepped cylindrical shape, including a large diameter portion having an outer diameter less than the inner diameter of the frame hole, the frame having a thickness. The small diameter portion has a length greater than the thickness of the frame such that a portion of the small diameter portion projects beyond the frame to form a projecting end when the shock absorber is disposed within the hole. A screw is inserted into the shock absorber, the screw fixing the motor to the frame. A nut securing the screw is provided such that at least one of the screw and nut clamps the projected end of the small diameter portion of the shock absorber against the frame.

13 Claims, 3 Drawing Sheets

PRINTER HAVING A SHOCK ABSORBER FOR A PRINTER MOTOR

BACKGROUND OF THE INVENTION

The present invention relates generally to a printer, more particularly a serial printer that prints images on a medium with a print head mounted on a reciprocating carriage that is driven by a motor. The present invention provides a printer with a novel and improved motor mounting structure for damping noise associated with vibrations of the printer motor.

In a printer, a motor that drives a carriage to reciprocate, enabling a print head mounted on the carriage to print data, makes noise when vibrations from the frequent and repeated forward and reverse operations of the motor are transmitted to the printer frame. To lessen the noise, damping structures have been devised, wherein shock absorbers are placed between the motor and the printer frame on which the motor is mounted.

One example of such damping structure is described in Unexamined Japanese Patent Publication No. Sho. 59-136280, and shown in FIG. 5. In reference to FIG. 5, a motor, generally indicated as 1, is fixed to a frame 2 through shock absorbers 3 by screws 4 and nuts 5. Each shock absorber 3 has an annular groove 3*a* on the outer circumference thereof, and annular groove 3*a* must be force-fitted into a hole 2*a* formed on frame 2. Since shock absorber 3 also includes flanged portion 3*b*, which has larger diameter than that of hole 2*a*, and since flanged portion 3*b* must be forced through hole 2*a* in order to force-fit annular groove 3*a* into hole 2*a*, this force-fitting process becomes a cumbersome operation. Moreover, such force-fitting is likely to cause breakage of shock absorber 3 or deformation of frame 2.

These problems can be overcome by changing the shape of hole 2*a*, as shown in FIG. 6. In reference to FIG. 6, each hole 2*a* of frame 2 is formed into a snowman-like shape that, in addition to having a small diameter hole, has a large diameter hole 2*a*'. Large diameter hole 2*a*' is of sufficient size to allow easy insertion of flanged portion 3*b* into it. Once flanged portion 3*b* is inserted into large diameter hole 2*a*', annular groove 3*a* is force-fitted into hole 2*a* by moving shock absorber 3 in the direction indicated by an arrow b.

The presence of large diameter hole 2*a*' makes fitting of annular groove 3*a* into hole 2*a* less cumbersome, and decreases the risk of damaging shock absorber 3 or frame 2 in the fitting process. However, this structure poses a different problem in that by making large diameter holes 2*a*', which would otherwise be unnecessary, the strength of frame 2 is reduced.

Accordingly, the present invention provides a printer having noise damping shock absorbers, which can be easily attached to the printer frame, without unnecessarily reducing the strength of the frame.

SUMMARY OF THE INVENTION

Generally speaking, in accordance with the present invention, a printer that forms prints with a print head mounted on a reciprocating carriage driven by a motor is provided, wherein the printer contains a novel arrangement for damping noise caused by the vibration of the motor.

The present invention includes a printer which comprises a frame having a hole therein. A carriage is slidably mounted within the frame. A print head for printing on a print medium is mounted on the carriage. A motor operatively coupled to the carriage drives the carriage in reciprocal motion. The motor is mounted on the frame. A shock absorber, of a resilient material, is interposed between the motor and the frame. The shock absorber is of stepped cylindrical shape including a small diameter portion that is inserted into the hole in the frame and a large diameter portion that has a diameter larger than the diameter of the hole in the frame. The length of the small diameter portion is greater than the thickness of the hole in the frame, so that a portion of the small diameter portion projects beyond the hole of the frame when disposed therein, forming a projecting end.

The motor is fixed to the frame by inserting a screw into the shock absorber when the shock absorber small diameter portion has been inserted into the hole of the frame. A nut is provided that secures the screw and also deforms the projecting end, clamping the projected end of the small diameter portion of the shock absorber onto the frame. In another embodiment of the invention, the projected end of the small diameter portion may be clamped to the frame not by the nut, but by a head of the screw.

In the printer described above, the carriage is caused to reciprocate while driven by the motor, and images are formed by the print head mounted on the carriage. The motor is fixed to the frame by the screws through the shock absorbers made of a resilient material, the screws being inserted through the shock absorbers. The shock absorbers operate to suppress the transmission of the vibrations of the motor to the frame. Thus the noise associated with the operation of the printer is reduced, and damping effects are obtained.

In addition, the stepped cylindrical shape of the shock absorber allows the shock absorber to be attached to the frame easily, without requiring unnecessary holes in the frame which may weaken the strength of the frame. Specifically, the small diameter portion of the shock absorber, which can be inserted into the hole in the frame, with a portion of it projecting beyond the frame easily pass through the hole in the frame without requiring an enlarged hole portion or deformation of the projected end. The projecting end of the shock absorber which projects beyond the frame when placed in the hole can be deformed to be clamped between the frame and the nut, the nut having been placed to secure the end of the screw and to provide a force to the projecting end that causes the projected end to be expanded outward and to be clamped on the frame. As a result, the frame adjacent the hole is clamped between these outwardly expanding projecting end s of the shock absorber and the large diameter portion of the shock absorber. Accordingly, this mechanism allows the shock absorber to be clamped on the frame without requiring force-fitting of shock absorbers into a frame hole having a smaller diameter than the shock absorbers. Moreover, there is no longer a need to make more holes in the frame than necessary.

In an exemplary embodiment of the invention, the shock absorber assembly also includes a sleeve having a flanged portion, wherein the sleeve has an outer diameter less than the inner diameter of the small diameter portion. The sleeve is inserted into the small diameter portion of the shock absorber from an end of the shock absorber opposite to the large diameter portion end, such that the flanged portion of the sleeve is located between the nut (or the head of the screw if the head of the screw is present instead of the nut) and the projected end. In this embodiment, the screw is inserted into the flanged sleeve that has been inserted into the shock absorber, rather than being inserted directly into the shock absorber. The sleeve deforms the projected end so that the frame is clamped between the large diameter portion of the shock absorber and the projected end.

The presence of the flanged sleeve makes the insertion of the screw into the shock absorber easier. In addition, by clamping the projecting end of the shock absorber with the flanged portion of the sleeve, instead of the nut or the head of the screw, the clamping can be accomplished more smoothly.

In yet another embodiment of the invention, the flanged sleeve regulates a distance between the flanged portion of the sleeve and the frame at the time of fixing of the motor to the frame. This allows the clamping force applied to the projecting end to be automatically set upon fixing the motor to the frame, thus allowing the projecting end to be in a stably expanded condition.

Accordingly, it is an object of this invention to provide a printer with a novel and improved arrangement for damping noise generated by the vibration of the motor.

Another object of the invention is to provide shock absorbers which can be attached to a frame of a printer easily and without reducing the strength of the frame unnecessarily.

A further object of the invention is to provide an improved mechanism for inserting screws into shock absorbers, when securing a motor to the frame, and a mechanism for smooth, stable, and reliable clamping of the shock absorbers on both sides of the frame.

Yet another object of the invention is to provide an improved mechanism for damping motor vibration in a printer using simple and inexpensive components.

Still other objects and advantages of the invention will in part be obvious and will in part be apparent from the specification and drawings.

The invention accordingly comprises the features of construction, combination of elements, and arrangement of parts, which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
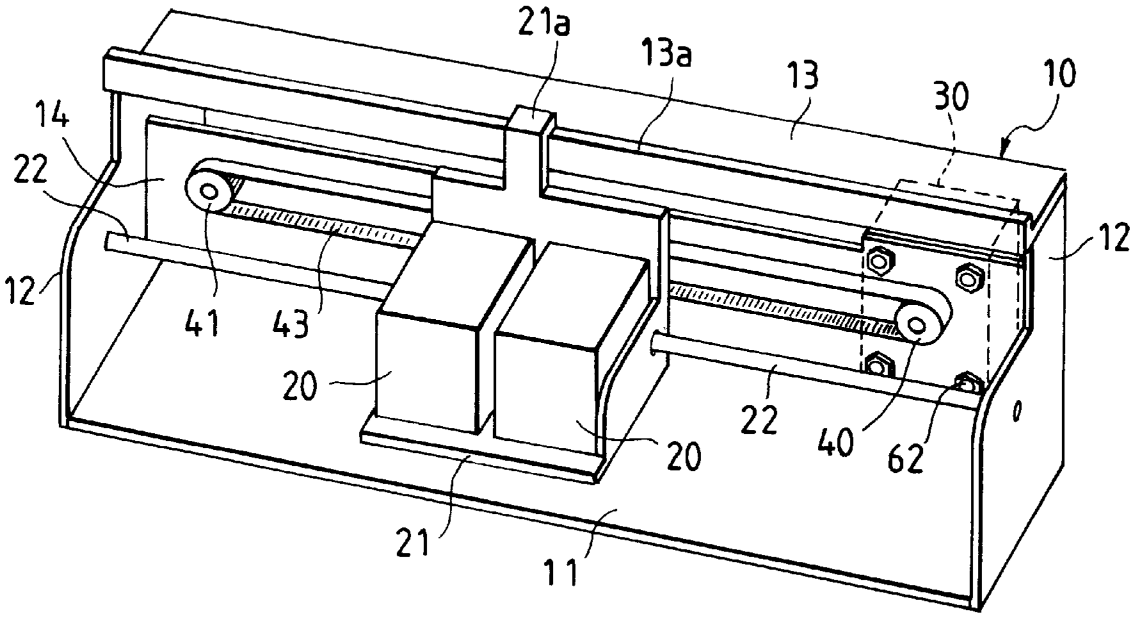
FIG. 1 is a perspective view showing a main portion of a printer constructed in accordance with a preferred embodiment of the present invention.

Reference is first made to FIG. 1 in which a perspective view of a main portion of a printer constructed in accordance with a preferred embodiment of the present invention is provided. In reference to FIG. 1, a printer frame, indicated generally as 10, includes a lower frame 11, an upper frame 13, and a pair of side frames 12. Each of side frames 12 is erected from lower frame 11 and bridges lower frame 11 with upper frame 13, the lower end of each side frame 12 being coupled to lower frame 11 and the upper end being coupled to upper frame 13. Frame 10 also includes a middle frame 14 that is coupled to the middle portions of side frames 12. In a non-limiting embodiment of the invention, frame 10 is made of a metal plate.

A guide shaft 22 is mounted between side frames 22. A guide rail 13*a* is formed on upper frame 13. A carriage 21 is slidably mounted on guide shaft 22, guide shaft 22 extending through carriage 21. A print head 20 is mounted on a carriage 21. Located on the upper part of carriage 21 is a hook portion 21*a*, which slidable engages carriage 21 to guide rail 13*a*. Accordingly, hook portion 21*a* and guide shaft 22 provide support for carriage 21 and allow the reciprocal movement of carriage 21 within frame 10.

A motor 30 will now be described with reference to FIG. 2. Motor 30 is mounted at one side of the back of middle frame 14 and has an output shaft 31. A drive pulley 40 is fixed to output shaft 31. An idle pulley 41 is rotatably supported by middle frame 14, on an opposed side of middle frame 14. An endless timing belt 43 is placed between drive pulley 40 and idle pulley 41, and a portion of endless timing belt 43 is fixed to the back of carriage 21.

When motor 30 is activated, drive pulley 40 rotates forward or in reverse, moving endless timing belt 43, which is placed between drive pulley 40 and idle pulley 41. In turn, the movement of endless timing belt 43 causes movement of carriage 21, which is attached thereto, leftward or rightward. Accordingly, the reciprocating action of carriage 21 is driven by motor 30.

When a paper to be used in printing is introduced into the printer, it is moved in a frontward direction from the backside of carriage 21 by a forwarding means (not shown) and passes below carriage 21. While the paper is being moved forward, print head 20 prints on the paper while reciprocating along shaft 22 with carriage 21.

Figure 2:
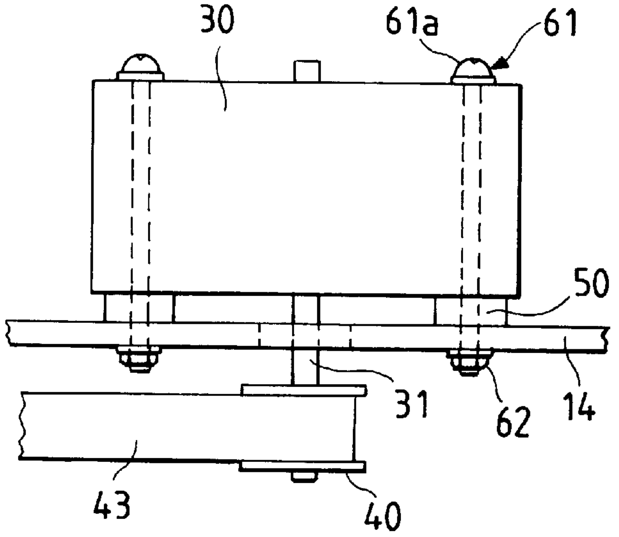
FIG. 2 is a plan view showing a motor mounting structure of the printer constructed in accordance with the invention.

As shown in FIG. 2, motor 30 is fixed to middle frame 14 through four shock absorbers 50 by four screws 61 and nuts 62. Each shock absorber 50 is made of a resilient material, and in one non-limiting embodiment of the invention, the resilient material is rubber.

Figure 4:
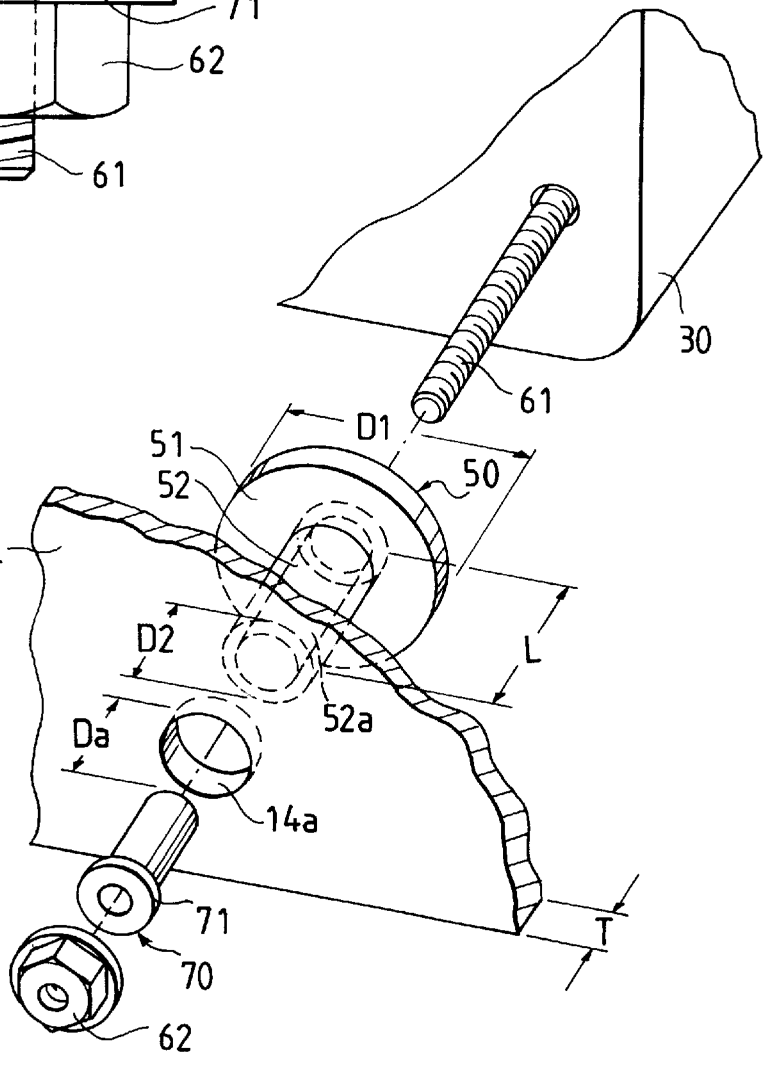
FIG. 4 is an enlarged exploded perspective view of the motor mounting structure constructed in accordance with the invention.
Figure 5:
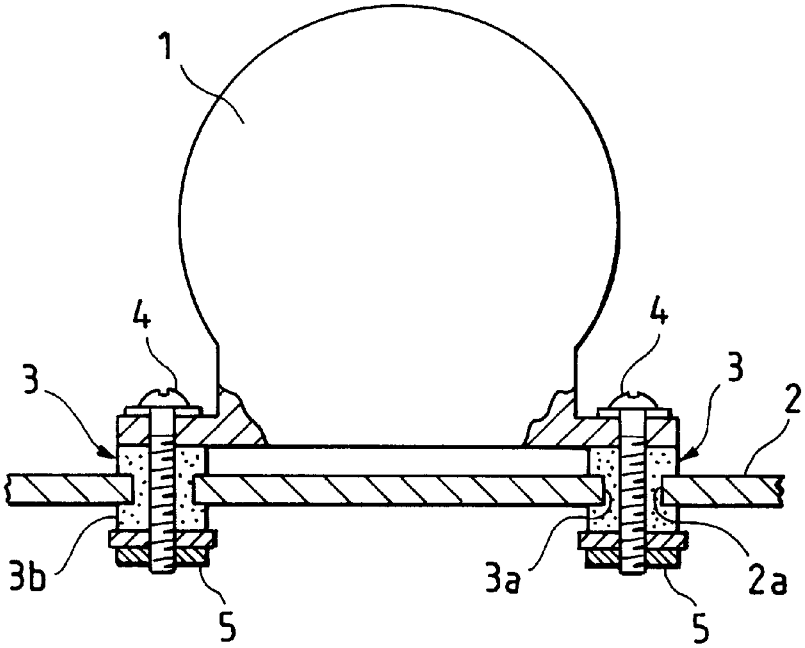
FIG. 5 PRIOR ART
FIG. 5 is a sectional view of a noise damping structure of a printer constructed in accordance with the prior art.
Figure 6:
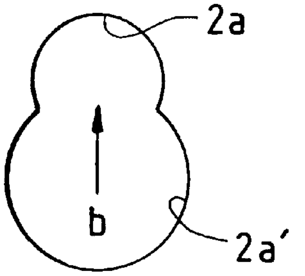
FIG. 6 PRIOR ART
FIG. 6 is a diagram illustrative of a frame hole constructed in accordance with the prior art.

Reference is now made to FIG. 4, which shows a partially enlarged exploded perspective view of the motor mounting structure. As shown in FIG. 4, each shock absorber 50 is formed into a stepped cylindrical shape having a large diameter portion 51 and a small diameter portion 52. A length L of small diameter portion 52 is greater than a thickness T of middle frame 14, and an outer diameter D2 of smaller diameter portion 52 is equal to or slightly smaller than a diameter Da of a hole 14*a*, which is formed in middle frame 14, allowing smaller diameter portion 52 to be inserted easily into hole 14*a*. In contrast, an outer diameter D1 of large diameter portion 51 is larger than diameter Da of hole 14*a*, preventing shock absorber 50 from passing entirely through hole 14*a*.

A flanged sleeve 70 having a flange portion 71 having an outer diameter greater than the inner diameter Da of hole 14*a*, and a body portion 73 having an outer diameter less than the inner diameter of small diameter portion 52 is inserted into small diameter portion 52 of shock absorber 50 from the side of shock absorber opposite the large diameter portion 51 end of shock absorber 50. It should be noted, however, that while it is preferred that the printer of the invention include flanged sleeve 70, it is not required for the invention.

To mount motor 30 onto middle frame 14, small diameter portion 52 of each shock absorber 50 is inserted into corresponding hole 14*a* located in middle frame 14 from the motor mounting side. Since length L of small diameter portion 52 is longer than thickness T of middle frame 14 at hole 14*a*, an end portion 52*a* of small diameter 52 projects beyond middle frame 14, when small diameter portion 52 of shock absorber 50 is inserted into hole 14*a*. Then, flanged sleeve 70 is inserted into the projecting end of each corresponding small diameter portion 52, i.e., from the side of shock absorber 50 opposite to the large diameter portion 51 end of shock absorber 50. Subsequently, screw 61 is inserted through the casing of motor 30 into shock absorber 50 and flanged sleeve 70, and is tightened onto nut 62 by turning, while nut 62 is held as to be unturnable with a tool or the like.

When screw 61 is tightened onto nut 62, nut 62 is drawn toward middle frame 14, gradually deforming projected end portion 52*a*; clamping projected end 52*a* of small diameter portion 52 of shock absorber 50 against middle frame 14 through flanged portion 71 of flanged sleeve 70. Since nut 62 is held as to be unturnable during the tightening, no torsional force is applied to projecting end 52*a*. Accordingly, projecting end 52*a* is prevented from being torsionally deformed during the tightening. In the absence of flanged sleeve 70, projecting end 52*a* can be directly clamped by nut 62.

If screw 61 and nut 62 are arranged in reverse, a head of 61*a* (FIG. 2) of screw 61 clamps projecting end 52*a* against middle frame 14 through flanged portion 71 of flanged sleeve 70. In the absence of flanged sleeve 70, head 61*a* can directly clamp projecting end 52*a*. When the arrangement of screw 61 and nut 62 is reversed, the tightening is accomplished by turning nut 62, while head 61*a* of screw 61 is fixed as to be unturnable by a screwdriver or the like. By preventing head 61*a* from being turned during the tightening operation, projecting end 52*a* is kept from being torsionally deformed or being twisted off.

Figure 3:
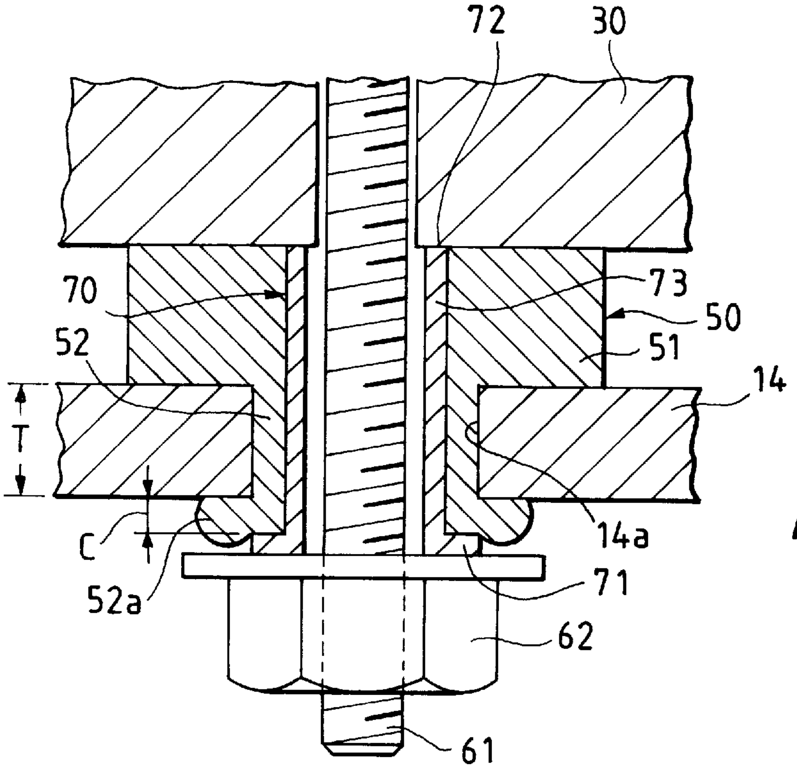
FIG. 3 is an enlarged cross-sectional view of the motor mounting structure of the printer constructed in accordance with the invention.

Reference is now made to FIG. 3 which shows a mounted shock absorber in accordance with the invention. When projecting end 52*a* is clamped, the deformation of projecting end 52*a* toward the center of hole 14*a* is regulated by flanged sleeve 70. Accordingly, projecting end 52*a* is gradually caused to expand outward. If flanged sleeve 70 is not present, the deformation of projecting end 52 can be regulated by the shaft of screw 61 by having the diameter of the shaft of screw 61 set to a value larger than that of the one shown in FIG. 3.

Further tightening of screw 61 results in motor 30 becoming completely fixed, when an end 72 of flanged sleeve 70 comes in contact with motor 30, and in projecting end 52*a* expanding outward completely (see FIG. 3). Since a distance C between flanged portion 71 and middle frame 14 is regulated by end 72 of flanged sleeve 70 coming in contact with motor 30, the clamping force applied to projecting end 52*a* is automatically set, allowing projecting end 52*a* to rest in the stably expanded condition.

The peripheral area of middle frame 14 adjacent to hole 14*a* is reliably clamped between large diameter portion 51 and projecting end 52*a* that has been expanded outwardly. Thus, satisfactory damping effects are reliably achieved.

The printer thus constructed can provide many advantages, several of which are set forth below.

A printer in accordance with the invention allows easy attachment of the shock absorbers to the printer or host device frame, without unnecessarily reducing the strength of the frame. This attachment of the shock absorbers reduces noise and vibration of the printer. These advantages can be seen more clearly by referring to the printer described above, however this device is suitable for mounting motors in devices which are not solely printers.

When in operation, motor 30 of the printer drives carriage 21 and causes it to reciprocate; print head 20, mounted on carriage 21, prints data. However, since motor 30 is fixed to middle frame 14 by screws 61 through shock absorbers 50 made of resilient material, transmission of the vibration of motor 30 to frame 10 can be suppressed by the operation of shock absorbers 50. This provides damping effects.

In addition, each shock absorber 50 is formed into a stepped cylindrical shape having large diameter portion 51 and small diameter portion 52. Small diameter portion 52 has length L that is longer than thickness T of middle frame 14, and is designed to be inserted into hole 14*a* of middle frame 14. Large diameter portion 51 has diameter D1, which is larger than diameter Da of hole 14*a*, and smaller diameter portion 52 has a diameter D2 which is less than Da. This stepped cylindrical arrangement allows shock absorbers 50 to attached easily to middle frame 14 without having to form unnecessary holes in middle frame 14.

Each of screws 61 is inserted through the casing of motor 30 into shock absorber 50. By turning screw 61 thus inserted, while holding nut 62 as to be unturnable, motor 30 is fixed to middle frame 14 and projecting end 52*a* of shock absorber 50 is clamped between nut 52 and middle frame 14, causing projecting end 52 to expand outward by the resiliency thereof, without torsionally deforming it. Therefore, the peripheral area of each of holes 14*a* of frames 14 are clamped between expanding projection 52*a* and large diameter portion 51 of each shock absorber 50, providing satisfactory damping effects. Thus, not only shock absorbers 50 can be attached to middle frame 14 easily, without reducing the strength of middle frame 14 unnecessarily, but noise reduction is also achieved as a result of the damping effects.

By providing flanged sleeves 70 in a printer of the invention, since each of flanged sleeves 70 is inserted into projecting end 52*a* of each shock absorber 50, screw 61 can be inserted into sleeve 70, rather than being inserted into shock absorber 50 directly. Accordingly, the presence of flanged sleeve 70 makes insertion of screw 61 easier. In addition, each of the projecting end s 52*a* is clamped through flange portion 71 of flanged sleeve 70. This allows the clamping of projection portion 52*a* to be implemented smoothly compared with the case where projecting end 52*a* is clamped directly by nut 62, or by head 61*a* of screw 61 in printers where the positions of screw 61 and nut 62 have been reversed.

Furthermore, flanged sleeve 70 regulates distance C between middle frame 14 and flanged portion 71 of sleeve 70 at the time of fixing of motor 30 to middle frame 14. Therefore, the clamping force to be applied to projection portion 52*a* is automatically set upon fixing of motor 30 to middle frame 14, which in turn contributes to bringing about a stably expanded condition of projecting end 52. Accordingly, the presence of flanged sleeve 70 allows reliable fixing of motor 30 to middle frame 14, and contributes to the achievement of satisfactory damping effects.

It should be noted, however, that even if flanged sleeve 70 is not designed to regulate distance C between flanged portion 71 of sleeve 70 and middle frame 14, this poses no problem, as long as the clamping force applied by screw 61 is controlled relatively correctly. If the clamping force is not controlled correctly, then the clamping force against projecting end 52*a* by nut 62 becomes inconsistent, making the expanded condition of projecting end 52*a* unstable. For example, if the clamping force is too large, distance C becomes too short. The thickness of expanding portion 52*a* is reduced, making it likely that sufficient damping effects will not be achieved. On the other hand, if the clamping force is too small, motor 30 might not be fixed stably to middle frame 14.

The present invention also provides an inexpensive way to provide damping effects, and thus noise reduction, because parts used for fixing motor 30 to middle frame 14 are inexpensive and easily obtained. For example, flanged sleeve 70, screw 61, and nut 62 are mass-produced items that are sold inexpensively; the stepped cylindrical arrangement of shock absorber 50, comprising large diameter portion 51 and small diameter portion 52, is a simply designed part.

Moreover, in a non-limiting embodiment of the invention, a washer may be interposed between motor 30 and each of shock absorbers 50. In addition, it should be noted that if the printer of the invention contains sleeve 70, end 72 of sleeve 70 is not required to come in direct contact with motor 30. Rather, end 72 may come in contact with a washer, so as to provide distance C between flanged portion 71 of sleeve 70 and middle frame 14.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention described herein, and all statements of the scope of the invention which, as a matter of language, might be said to fall therebetween.

What is claimed is:

1. A printer comprising:

a frame having a thickness and defining a frame hole therethrough;

a carriage slideably mounted on said frame to reciprocate between at least two positions in a reciprocating direction parallel to said frame;

a print head mounted on said carriage;

a motor mounted on said frame and operatively coupled to said carriage to drive said carriage to reciprocate in the reciprocating direction;

a shock absorber interposed between said motor and said frame, said shock absorber defining a bore, said shock absorber being of a resilient material and including a large diameter portion having an outer diameter larger than the inner diameter of said frame hole and a small diameter portion having an outer diameter smaller than the diameter of said frame hole when the small diameter portion is in an uncompressed condition, said small diameter portion having a length greater than the thickness of said frame such that a portion of said small diameter portion projects beyond said frame to form a projecting end when said shock absorber is disposed within said hole, said projecting end having an outer diameter smaller than the diameter of said frame hole when said projecting end is in an uncompressed condition;

a screw inserted into said bore of said shock absorber, said screw fixing said motor to said frame; and a nut for securing said screw, at least one of said screw and nut clamping, and compressing said projecting end of said shock absorber against said frame such that the outer diameter of said projecting end is greater than the diameter of said frame hole when said screw and said nut are tightened together.

2. The printer according to claim 1, comprising a sleeve having a first end and a second end and a flanged portion at the first end thereof, said sleeve defining a sleeve bore sized to accommodate said screw, said sleeve being disposed within said shock absorber, such that said flanged portion contacts said projecting end of said small diameter portion of said shock absorber to clamp said projecting end between said flanged portion of said sleeve and said frame when said screw and said nut are tightened together.

3. The printer according to claim 2, wherein said sleeve is sized and positioned to regulate a minimum distance between the nut and the motor when said screw and said nut are tightened together to abut said first end portion of said sleeve against said motor and said second end portion against said nut.

4. The printer according to claim 2, wherein said projecting end and said nut are constructed and arranged so that the nut clamps said projecting end of said smaller diameter portion of said shock absorber against said frame without placing a torsional force on said projected end.

5. The printer according to claim 2, wherein said printer is an ink jet printer.

6. The printer according to claim 1, wherein said projecting end and said nut are constructed and arranged so that the nut clamps said projecting end of said small diameter portion of said shock absorber against said frame without placing a torsional force on said projected end.

7. The printer according to claim 1, wherein said printer is an ink jet printer.

8. The printer according to claim 1, comprising a sleeve having a first end and a second end, said sleeve defining a sleeve bore sized to accommodate said screw, said sleeve being disposed within said shock absorber, and said sleeve dimensioned to regulate the maximum compression of the shock absorber when said screw and said nut are tightened together to compress said projecting end of said small diameter portion between said screw wall and said frame.

9. A printer comprising:

a frame having a thickness and defining a frame hole therethrough;

a carriage slideably mounted on said frame to reciprocate between at least two positions in a reciprocating direction parallel to said frame;

a print head mounted on said carriage;

a motor mounted on said frame and operatively coupled to said carriage to drive said carriage to reciprocate in the reciprocating direction;

a shock absorber interposed between said motor and said frame, said shock absorber defining a bore, said shock absorber being of a resilient material and including a large diameter portion having an outer diameter larger than the inner diameter of said frame hole and a small diameter portion having an outer diameter smaller than the diameter of said frame hole when the small diameter portion is in an uncompressed condition, said small diameter portion having a length greater than the thickness of said frame such that a portion of said small diameter portion projects beyond said frame to foil a projecting end when said shock absorber is disposed within said hole, said projecting end having an outer diameter smaller than the diameter of said frame hole when said projecting end is in an uncompressed condition;

a screw having a head with a wall inserted into said bore of said shock absorber, said screw fixing said motor to said frame and a head of the screw clamping the projected end of the small diameter portion of the shock absorber against said frame such that the outer diameter of said projecting end is greater than the diameter of said frame hole.

10. The printer according to claim 9, comprising a sleeve having a first end and a second end and a flanged portion at the first end thereof, said sleeve defining a sleeve bore sized to accommodate said screw, said sleeve being disposed within said shock absorber, such that said flanged portion contacts said projecting end of said small diameter portion of said shock absorber to clamp said projecting end between said screw wall and said frame when said screw is tightened.

11. The printer according to claim 10, wherein said sleeve is sized and positioned to regulate a minimum distance between the screw and the motor when said screw head is tightened to abut said first end portion of said sleeve against said motor and said second end portion against said screw wall.

12. The printer according to claim 9, wherein said head of said screw clamps said projecting end of said small diameter portion of said shock absorber against said frame without placing a torsional force on said projected end.

13. The printer according to claim 9, comprising a sleeve having a first end and a second end, said sleeve defining a sleeve bore sized to accommodate said screw, said sleeve being disposed within said shock absorber, and said sleeve dimensioned to regulate the maximum compression of the shock absorber when said screw and said nut are tightened together to compress said projecting end of said small diameter portion between said screw wall and said frame.

* * * * *